March 25, 1952 D. B. DORSEY 2,590,161
CAMERA EXPOSURE CONTROL
Filed July 1, 1948 2 SHEETS—SHEET 1

INVENTOR.
Dennis B. Dorsey
BY
Moore, Olson & Trexler
attys.

March 25, 1952   D. B. DORSEY   2,590,161
CAMERA EXPOSURE CONTROL
Filed July 1, 1948   2 SHEETS—SHEET 2
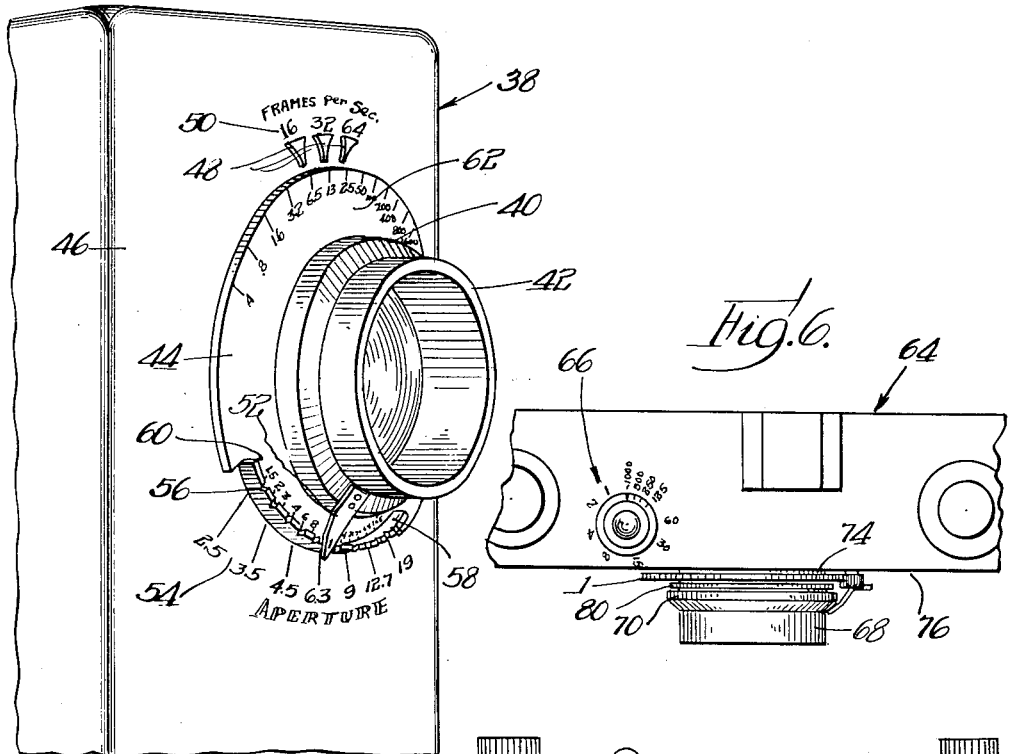
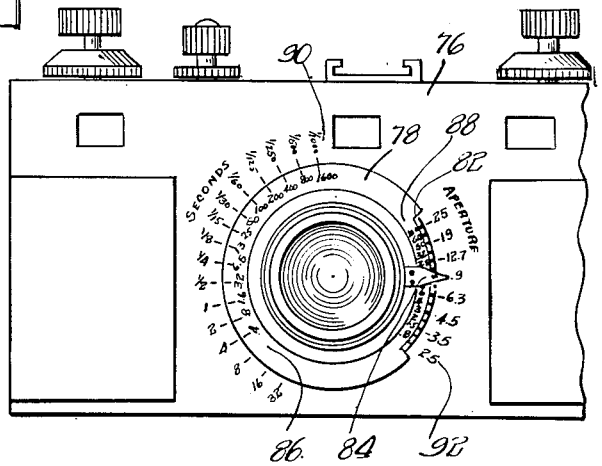
Inventor
Dennis B. Dorsey
By: — Moore, Olson & Trexler
attys.

Patented Mar. 25, 1952

2,590,161

UNITED STATES PATENT OFFICE 2,590,161

CAMERA EXPOSURE CONTROL

Dennis B. Dorsey, Chicago, Ill.

Application July 1, 1948, Serial No. 36,500

1 Claim. (Cl. 95—64)

This invention relates to camera controls.

It is a principal object of this invention to provide simple and inexpensive means in and for a camera for determining the proper setting of the shutter opening by the selection of the shutter speed, or vice versa, and in accordance with the measured light conditions, the film speed rating and filter factor.

It is a further object of the invention to provide in a camera means for adjustably relating the shutter speed setting to the shutter opening setting in such a manner that one of said settings will determine the other setting in accordance with the measured light conditions.

In the taking of successful pictures under all of the various conditions and on all of the various different speed films, it is necessary for the photographer first to measure the light conditions to obtain a light "rating" and thereafter utilizing that rating to set a complicated series of dials having complex scales to determine the shutter openings for different speed settings and different film speed ratings and filter factors. It frequently happens that the shutter opening when finally determined is beyond the range of the camera which is possessed by the photographer and the complicated series of operations must be repeated for a slower or faster shutter speed until a shutter opening figure is obtained for which the camera can be set. This method of determining the proper setting is always irksome to the amateur photographer; a source of great annoyance to those being photographed, particularly children, and requires so much time to perform that "activity" pictures are lost or taken at haphazardly chosen settings. It is accordingly an object of this invention to provide an exposure setting guide and control properly relating all the various factors so that in order to take a picture it is merely necessary to measure the light conditions to obtain a light "rating" figure and then set the guide so that that figure is brought into registry with the shutter speed setting and thereupon the shutter opening setter will be positioned for taking the picture at the proper shutter opening.

Other and further objects and advantages of the invention will be apparent from the following description when taken in connection with the accompanying drawings wherein:

Fig. 5 is a fragmentary view in perspective of another type of camera embodying the present invention; and Figs. 6 and 7 are fragmentary views in plan and elevation respectively of still another type of camera embodying the invention.

Figure 2:
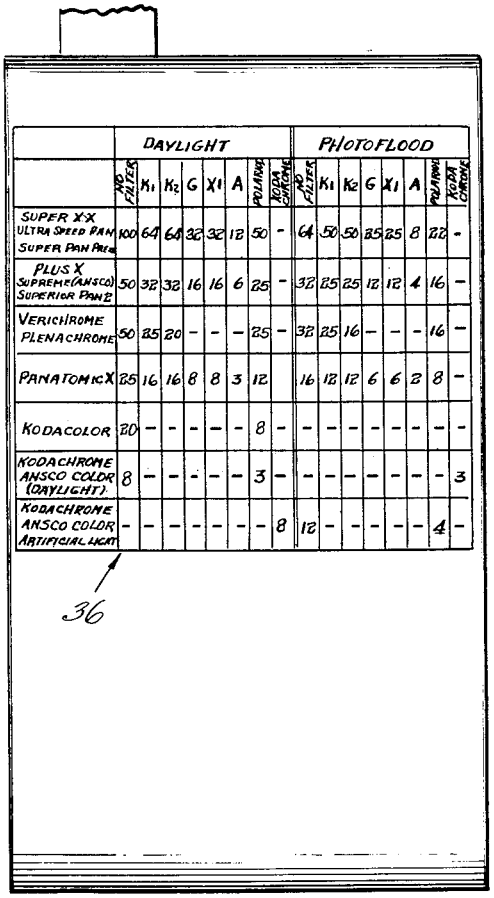
Fig. 2 is a view in rear elevation of a camera embodying the invention.
Figure 1:
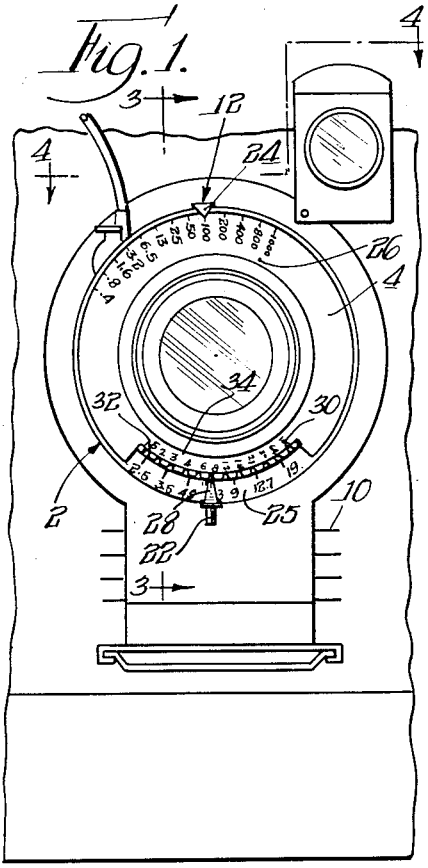
Fig. 1 is a fragmentary view in elevation of a camera embodying the invention.
Figure 3:
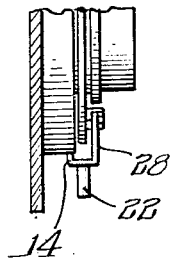
Fig. 3 is a fragmentary view in section taken along the line 3—3 of Fig. 1.

As shown in Figs. 1 to 4, a bellows, or other "between the lens," type camera embodying the present invention may comprise an exposure guide control means 2 in the form of a disk 4 mounted on the lens housing tube 6 as by ring 8 or other suitable retainer threaded or otherwise fitted on the lens tube. The lens tube is mounted in a conventional manner on the forward end of the bellows 10 and carries an exposure time setter 12 and an exposure opening control 14 connected in the usual manner to the usual exposure timer and the usual iris diaphragm controlling the size of the shutter opening. The exposure time setter 12 has the usual pointer 16 which cooperates with a shutter speed scale 18 on the periphery of the conventional drum 20 and the shutter opening control 14 has the usual pointer 22 which cooperates with the usual scale 25 on the surface of a ring or disk which encompasses the lens tube 6 and closes or forms the forward end of the drum 20.

It should be noted that the camera illustrated is of the type, well known in the prior art, in which the angular adjustments of the time setter 12 and the opening control 14 are equal, i. e., the numbers of each scale, 18 and 25, are equally spaced and the arcuate movement of the pointer 16 from one scale number to the next is equal to the arcuate movement of the pointer 22 from one scale number to the next.

The exposure opening control 14 extends in the usual manner through a suitable slot, not shown, in the periphery of the drum 20 so as to control the setting of the diaphragm that determines the size of the shutter opening. The disk 4 is mounted on the lens tube 6 in position to cooperate with the pointers 16 and 22, the pointer 16 being for that purpose provided with a depending portion or tip 24 extending over the disk 4 and cooperating with a light rating scale 26. The pointer 22 for the exposure opening control 14 extends over the exposure opening scale 25 on the front face of the drum 20 at the bottom thereof and is provided with a resilient or flexible tip portion 28. The disk 4 is formed with a segmentally cut out section exposing the scale 25 and an arcuate axially directed rim portion or flange 30 having a series of angularly spaced notches 32 cooperating with an emulsion rating and filter factor scale 34 marked on the surface of the disk adjacent the arcuate axially directed rim portion 30.

The resilient pointer portion 28 with the exposure opening pointer 22 is positioned and shaped for detachable reception in the notches 32 and readily disengaged by inserting the fingernail under it and lifting it out of the notch into which it may be engaged at any time.

As shown in Fig. 2, the rear face of the camera is provided with a film rating, filter factor chart 36 specifying for each of the best known films the proper speed rating for daylight and photoflood use and the various speed ratings of each of the films when taking a picture either under daylight or photoflood conditions and by the use of any of the most commonly used filters. As shown in that chart, for example, the film speed rating for Super XX film when used under daylight conditions and without a filter is 100, while used without a filter under photoflood conditions is 64, and the filter factor ratings for different filters used under the two different lighting conditions varies from 8, which is the speed film rating using an A filter under photoflood lighting conditions, to 64, which is the film speed rating when using a K1 filter under daylight conditions.

The film speed ratings shown in the chart of Fig. 2 are taken or calculated from the Weston ratings but it is to be understood that such ratings may be taken or calculated from any other known system of basic film speed ratings.

Similar ratings are provided for the other most popular types of films such as the Ultra Speed Pan, the Super Pan Press, the Plus X, the Supreme, the Superior Pan 2, the Verichrome, the Plenachrome, the Panatomic X, the Kodacolor, the Kodachrome and Ansco Color for daylight use, and the Kodachrome and Ansco Color for artificial light.

The scale 34 is composed of the ratings taken from the chart 36, the various indicia of the scale being appropriately related as by the location of the flexible portion 28 of the exposure opening control 14 with the selected notch corresponding to the film speed rating.

The stamping of the annular, axially directed rim 30 from the periphery of the disk 4 leaves an arcuate recess in the rim of the disk uncovering the exposure opening scale 25 so that the pointer 28 also cooperates with that scale to indicate the exposure opening setting.

In use, the flexible pointer 28 is set into a notch 32 corresponding to the film speed rating applicable to the particular type of film in the camera. This is preferably done at the time the film is placed in the camera. If the camera is normally or most frequently used for taking pictures in daylight or under photoflood conditions, the pointer is accordingly set in the notch corresponding to the appropriate film speed rating. If the pictures are most usually taken with a particular filter on the camera, the pointer is correspondingly set for the appropriate film speed rating which takes into account the filter factor for that most usually employed filter. Whatever may be the usual circumstances which govern the initial setting of the pointer, that setting may be readily changed when it is desired to take pictures under different lighting conditions, i. e., daylight or photoflood, or with different filters.

When it is desired to take a picture it is then merely necessary to measure the prevailing light conditions, by the usual photometer or light meter and read from the meter the "light rating." The disk 4 may then be turned to bring the same light rating of scale 26 into registry with the pointer 24 of the time exposure setter 12. This turning of the disk 4 automatically causes turning of the exposure control 14 to the proper exposure opening setting as indicated by the exposure opening scale 25.

If, subsequently, the time exposure setting is varied by turning the time exposure setter 12, it is merely necessary to turn the disk 4 to bring that light rating of scale 26 to the new setting of the pointer 24, and this turning of the disk automatically sets the exposure control 14 to the proper position.

It is frequently desirable to select the shutter or exposure opening and thereafter to set the shutter speed to the proper value required for taking the picture at the selected shutter opening. It will be evident that in such cases the pointer 22 may be initially set at such a selected shutter opening, thereby presetting the disk 4. Accordingly, when the scene brightness or light rating is determined or measured by the exposure meter then the pointer 16 may be adjusted until its tip 24 is aligned with the number of the scale 26 corresponding to the value of scene brightness or light rating as read directly from the exposure meter.

Figure 4:
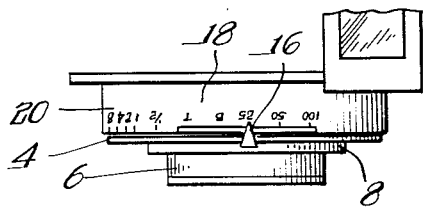
Fig. 4 is a fragmentary view in horizontal section taken substantially along the line 4—4 of Fig. 1.

It should be noted that as seen in Fig. 4, the time speed setting scale 18 includes time exposure intervals from one-half a second to eight seconds or longer. In a common form of the camera illustrated in Fig. 4, the slowest instantaneous exposure which can be taken is one twenty-fifth of a second. For taking longer exposures, it is desirable for the photographer to have some indication of the proper time and exposure opening needed at the measured scene brightness and in accordance with the speed rating or filter factor of the film. Accordingly, applicant extends the usual shutter speed scale by the addition of the time exposure determining numbers from one-half a second to eight seconds or to sixteen seconds or to thirty-two seconds, etc., as may be appropriate for the particular camera. Accordingly, when the scene brightness or light rating as measured by the exposure meter is of such low value that an exposure longer than slowest shutter speed is required, alignment of the scene brightness or light rating number of scale 26 with the time exposure numbers of the scale 18 serves to indicate the proper interval for the time exposure at the previously selected shutter opening or at the maximum permissible shutter opening, if it is desired to make the time exposure as short as possible. The previous selection of the maximum shutter opening will set the control disk 4 to a certain position and the alignment of the subsequently determined scene brightness of scale 26 with the time exposure intervals of scale 18, will indicate the shortest possible exposure interval.

If, however, it is desired to take a picture at a previously selected time exposure interval, the turning of the disk 4 to bring the determined scene brightness rating of scale 26 into alignment with that selected time exposure interval will automatically set the exposure opening to the proper value.

In the embodiment shown in Fig. 5, a moving picture camera 38 having an exposure opening control ring 40 surrounding the lens tube 42 is provided with an exposure guide or control disk 44 similar to the disk 4 and mounted on the lens tube between the adjusting ring 40 and the front wall 46 of the camera. If the movie camera 38 is of the variable speed type adjustable to take pictures at different timing speeds, the front wall 46 of the camera is provided with or has inscribed thereon suitable pointers 48 adjacent the periphery of the disk 44 and marked with a suitable frames per second scale 50. The exposure control ring 40 carries the usual resilient pointer 52 which cooperates with the usual arcuately arranged exposure opening scale 54 on the front wall 46 of the camera. Pointer 52 also cooperates with and is selectively receivable in notches 56 of an annular, axially directed rim portion 58 of the disk 44. The notches 56 cooperate with a film speed rating scale 60 inscribed on the surface of the disk 44 adjacent and within the annular flange portion 58. The disk 44 is also provided with a light rating scale 62 which cooperates with the pointers 48 of the frames per second scale 50.

The exposure guide and control shown in Fig. 5 operates similarly to that shown in Figs. 1 to 4. A light rating number determinative of the light conditions is determined by the usual exposure meter and the corresponding number of the light rating scale 62 on the disk 44 is set opposite the pointer 48 corresponding to the frames per second for which the camera is set. The pointer 52 of the exposure opening control ring 40 having previously been set into the notch 56 opposite the proper film speed rating and filter factor number of scale 60, the rotation of the disk to align the proper light rating number of scale 62 with the appropriate frames per second pointer automatically sets the exposure opening control ring at the proper exposure opening as indicated on the fixed scale 54 by the pointer 52.

In the embodiment shown in Figs. 6 and 7, a camera of the focal plane shutter and interchangeable lens type is supplied with the usual exposure time setter 66 located on the top wall of the camera and a detachable, interchangeable lens 68 including a diaphragm opening control ring 70, the unit 68 with the control ring 70 rotatably mounted thereon being detachably associated in the usual manner with a receiving tube 74 in and projecting slightly forward from the front wall 76 of the camera. An exposure guide control means in the form of a disk 78 in every respect, except size, identical to the exposure guide control disk 44, is mounted on the projecting portion of the receiving tube 74 for the lens unit and is secured thereon against axial movement by a threaded collar 80, the forward end portion of the tube being externally threaded to receive the internally threaded clamping ring 8. The disk 78 is of course mounted for free rotation on the tube 74 and its notched arcuate flange portion 82 cooperates with a resilient pointer 84 carried by the diaphragm opening control ring 70 to set the diaphragm opening. The disk 78 is provided with the light rating scale 86 corresponding to the scale 62 of the exposure disk 44 of Fig. 5 and a film speed rating scale 88.

The front wall 76 is provided with an arcuate exposure timing scale 90 about the periphery of the disk 78, the scale 90 conforming to the scale of the exposure time setter 66 on the top wall of the camera. The forward wall 76 of the camera is also provided with a diaphragm opening scale 92 extending arcuately of the disk 78 in juxtaposition to the arcuate flange 82 of the disk and cooperating with the pointer 84 of the diaphragm opening control ring 70.

The use of the exposure guide and control means or disk 78 in the form of the invention shown in Figs. 6 and 7 is the same as with the embodiment shown in Fig. 5, the pointer 84 being set, when the camera is initially loaded, into the notch of the arcuate flange 82 corresponding to the film speed rating and filter factor of the film employed and the filter commonly used with that film. The exposure time setter 66 is of course set to take any particular picture at the most desirable speed or time interval and a light rating number having been determined by use of an exposure meter, the corresponding light rating number of scale 86 is set by rotation of the disk 78 in alignment with the exposure interval indicated by scale 90 and corresponding to the setting of the exposure time setter 66. This rotation of the disk 78 automatically effects proper setting of the exposure or diaphragm opening by causing rotation of the diaphragm opening control ring 70.

As described with reference to Figs. 1 to 4, the disk 78 may also be used to determine the proper shutter speed setting from a previously selected shutter opening setting.

It should be noted that the exposure timing scale 90 is extended to include time exposure determining intervals, similarly to the scale 18 of the camera shown in Figs. 1 to 4, which time exposure numbers on the scale 90 cooperate with the light rating scale 86 of the disk 78 to indicate to the photographer the proper time exposure intervals according to the exposure opening settings.

A very important feature of applicant's invention resides in the fact that the means used for automatically setting the exposure opening in accordance with the time speed setting, or determining the proper time speed setting from a previously selected exposure opening setting, does not interfere in any way with the normal use of the camera for taking photo-flash pictures.

It will be evident from the foregoing that applicant has provided a simple and inexpensive means in and for a camera for determining the proper setting of the shutter opening in accordance with the selected shutter speed, the measured light conditions, the film speed rating and filter factor; means for adjustably relating the shutter speed setting to the shutter opening setting in such a manner that setting of such means in respect to the selected shutter speed setting in accordance with the measured light conditions will automatically select the proper shutter opening for taking the picture, and an exposure setting guide and control properly relating all the various factors so that in order to take a picture it is merely necessary to measure the light conditions to obtain a light "rating" or scene brightness figure and then set the guide so that that figure is brought into registry with the shutter speed setting and thereupon the shutter opening setter will be positioned for taking the picture at the proper shutter opening.

It will be obvious that changes may be made in the form, construction and arrangement of the parts without departing from the spirit of the invention or sacrificing any of its advantages, and the right is hereby reserved to make all such changes as fairly fall within the scope of the following claim.

What I claim is:

In a shutter type camera having a lens tube, an exposure time setter adjustable arcuately about the axis of the lens tube, a shutter speed scale with which said time setter cooperates, an exposure opening setter oppositely positioned on the opposite side of said lens tube from said time setter and also adjustable arcuately about the axis of said lens tube, an exposure opening scale with which said exposure opening setter cooperates, an exposure control ring shiftably mounted on said lens tube and having a light rating scale alignable with the time setter to align a number of said scale corresponding to light rating conditions with the time setter, said control ring having a film speed scale and an arcuate notched segment adjacent the exposure opening scale, said exposure opening setter including a resilient arm portion providing an indicator for said film speed scale and said exposure opening scale, said arm traversing said arcuate segment and selectively engageable with the notches therein and normally maintained in locked engagement with a notch corresponding to the predetermined setting of the arm with respect to the film speed scale whereby the ring and exposure opening setter and arm are rotated in unison upon variation of the relative settings of the light rating scale and the shutter speed scale.

DENNIS B. DORSEY.

REFERENCES CITED

The following references are of record in the file of this patent:

UNITED STATES PATENTS

| Number | Name | Date |
|---|---|---|
| 883,607 | Andrews | Mar. 31, 1908 |
| 1,543,208 | Fairchild | June 23, 1925 |
| 1,623,998 | Cooke | Apr. 12, 1927 |
| 2,105,631 | Becker | Jan. 18, 1938 |
| 2,222,298 | Nerwin | Nov. 19, 1940 |
| 2,343,257 | Hineline | Mar. 7, 1944 |

FOREIGN PATENTS

| Number | Country | Date |
|---|---|---|
| 303,088 | Germany | Jan. 18, 1918 |